(12) United States Patent
Mallard

(10) Patent No.: US 10,387,762 B1
(45) Date of Patent: Aug. 20, 2019

(54) SYSTEM AND METHOD FOR SCANNING AND FILTERING CREDENTIALS

(71) Applicant: George Mallard, The Woodlands, TX (US)

(72) Inventor: George Mallard, The Woodlands, TX (US)

( * ) Notice: Subject to any disclaimer, the term of this patent is extended or adjusted under 35 U.S.C. 154(b) by 0 days.

(21) Appl. No.: 15/828,814

(22) Filed: Dec. 1, 2017

Related U.S. Application Data

(60) Provisional application No. 62/429,031, filed on Dec. 1, 2016.

(51) Int. Cl.
| | |
|---|---|
| *G07C 9/00* | (2006.01) |
| *G06K 19/077* | (2006.01) |
| *G06K 7/10* | (2006.01) |
| *G06F 21/35* | (2013.01) |

(52) U.S. Cl.
CPC ....... *G06K 19/07749* (2013.01); *G06F 21/35* (2013.01); *G06K 7/10178* (2013.01); *G06K 7/10336* (2013.01)

(58) Field of Classification Search
None
See application file for complete search history.

(56) References Cited

U.S. PATENT DOCUMENTS

| | | |
|---|---|---|
| 4,112,394 A | 9/1978 | Kershaw |
| 7,040,458 B2 | 5/2006 | Forsythe et al. |
| 7,091,859 B2 | 8/2006 | Duron et al. |
| 7,180,423 B2 | 2/2007 | Forster et al. |
| 7,353,915 B2 | 4/2008 | Zaharia et al. |
| 7,973,662 B2 | 7/2011 | Phipps et al. |
| 8,370,911 B1 | 2/2013 | Mallard |
| 9,019,071 B1 | 4/2015 | Mallard |
| 9,165,123 B1 | 10/2015 | Mallard |
| 9,262,879 B2 * | 2/2016 | Ahearn ............. G07C 9/00174 |
| 9,443,362 B2 * | 9/2016 | Singh ................. G07C 9/00111 |
| 9,710,987 B2 * | 7/2017 | Scoggins ........... G07C 9/00904 |
| 9,922,476 B2 * | 3/2018 | Masters ............. G07C 9/00103 |

FOREIGN PATENT DOCUMENTS

WO    WO2004107251    12/2004

\* cited by examiner

*Primary Examiner* — K. Wong
(74) *Attorney, Agent, or Firm* — Lee & Lin IP PLLC; Jeong-Eun Lee-Nago; Rita H. Lin

(57) ABSTRACT

A system and method for reading a credential for an access system is provided. The system may include one or more readers, reader pickup coils, credential read heads, credential switches selectively connecting and disconnecting the reader pickup coil and its respective credential read head, and virtually real credentials. When a user presents a credential to a reader, the user's credential is read, and the appropriate virtually real credential is interrogated, and its indicium is transmitted to the reader. The system then grants the user access or no access depending on the indicium received.

45 Claims, 14 Drawing Sheets

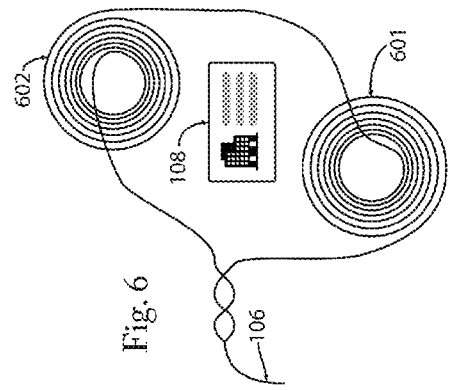
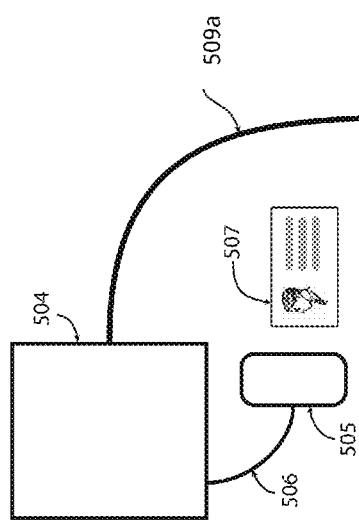
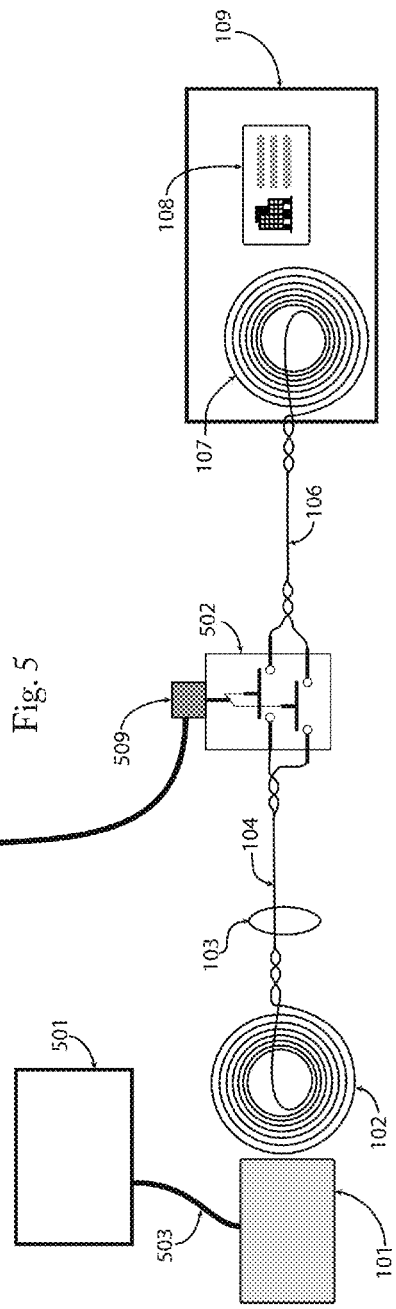

SYSTEM AND METHOD FOR SCANNING AND FILTERING CREDENTIALS

CROSS REFERENCE TO RELATED APPLICATIONS

The application claims the benefit of U.S. Provisional Application No. 62/429,031, filed on Dec. 1, 2016, which is incorporated by reference herein in its entirety.

FIELD OF INVENTION

The invention is related to credential readers of access control systems, and more particularly to readers for scanning an RFID input, such as a user credential.

BACKGROUND OF THE INVENTION

The invention relates generally to credential readers of access control systems, and more particularly to readers for scanning an RFID (radio frequency identification) input, such as a user credential.

For over thirty years, access control systems have often been used to impede unauthorized personnel from accessing floors or other areas such as in a building, for example, by using the elevators to gain access to certain floors. A technology employing elevator dispatch kiosks emerged to capture destinations, thus improving real time planning for elevator scheduling. These systems typically are able to both reduce wait time and reduce energy consumption. U.S. Pat. No. 7,040,458B2 is directed to the operation of one of these systems. Tenant security may be enhanced by restricting destination floors based on presented credentials. Such a secured elevator dispatch system typically impedes access to unauthorized floors.

In accordance with an operation of a secured elevator dispatch system, a credential is presented to a kiosk reader. The reader retrieves the credential indicium, which the elevator dispatch system uses to retrieve the allowed floors from the elevator database, base building database, or other applicable database for the indicium. The desired floor is chosen from the kiosk by the credential holder. The elevator system schedules a cab for the selected floor, and the elevator dispatch system directs the credential holder to enter the scheduled cab.

A possible problem with the system described above is that the tenant's employees must hold a credential stored in the elevator dispatch system database. As taught by U.S. Pat. No. 8,370,911, this may not be desirable, and may introduce problems. For example, database synchronization and exposure of the tenant employee list to third parties are two potential problems that may arise. Furthermore, elevator dispatch systems may be programmed to respond to unknown cards with an error message to the person presenting the card at the kiosk. This error message often introduces delays and confusion for the person selecting his destination, which may be undesirable in certain applications.

As taught by U.S. Pat. No. 9,019,071, methods exist that rely upon de facto industry standards for communication between the RFID reader and the associated security equipment. A potential problem is that new technologies have been introduced, which do not rely upon the de facto industry standard connections, or which are encrypted like OSDP (Open Supervised Device Protocol) which seeks to cryptographically secure the data side of the reader. Additionally, the architectural demands on the kiosk may preclude industry de facto standard readers.

Accordingly, it is desirable to provide an improved system, method and device for scanning a variety of RFID input, such as a variety of user credentials, which overcome drawbacks and inadequacies of known devices, methods and systems.

SUMMARY OF THE INVENTIONS

Generally speaking, in accordance with an embodiment of the invention, a system and method combines one or more readers with one or more switching assemblies and one or more credentials, preferably virtually real credentials, wherein the switching assemblies and transmission lines integrate the technologies without reliance upon de facto standards. A plurality of credential pickup coils may be connected via transmission lines to a common reader pickup coil positioned proximate its respective reader such that electromagnetic signals may be transmitted between the reader pickup coil and its respective reader. The credential pickup coils may be connected to the reader pickup coil in series or in parallel.

Another embodiment of the invention is directed to a system having a tenant credential reader connected to a coordinating system, which activates a credential selector switch to connect a reader pickup coil to a credential pickup coil.

Yet another embodiment of the invention is directed to a system having two or more reader pickup coils proximate a multiple frequency capable reader, each reader pickup coil connected via respective switches to respective credential pickup coils, which read respective credentials having different frequencies from each other.

An embodiment of the invention further includes a credential carousel for physically moving a plurality of credentials with respect to a credential pickup coil.

Another embodiment of the invention further includes a tamper monitoring system, such as a tamper reader connected to a tenant credential assembly via a common switch that connects or disconnects the associated credential read head to the system reader.

An embodiment of the invention further includes a switch connecting a tenant reader assembly to a public reader pickup coil, and a second switch selectively connecting a dispatch system reader assembly to either the public reader pickup coil or one or more tenant credential assemblies.

Another embodiment of the invention is directed to a system having a credential synthesizer.

Still other objects and advantages of the invention will in part be obvious and will in part be apparent from the specification. Other features and advantages of this invention will become apparent in the following detailed description of exemplary embodiments of this invention with reference to the accompanying drawings.

BRIEF DESCRIPTION OF THE DRAWINGS

For a fuller understanding of the invention, reference is made to the following description taken in connection with the accompanying drawing, in which:

FIG. 5 is a schematic diagram of a system in accordance with an embodiment of the invention having a single virtually real credential;

FIG. 6 is a schematic diagram of a credential read head with a Helmholtz coil arrangement;

DETAILED DESCRIPTION OF THE PREFERRED EMBODIMENTS

Figure 1:
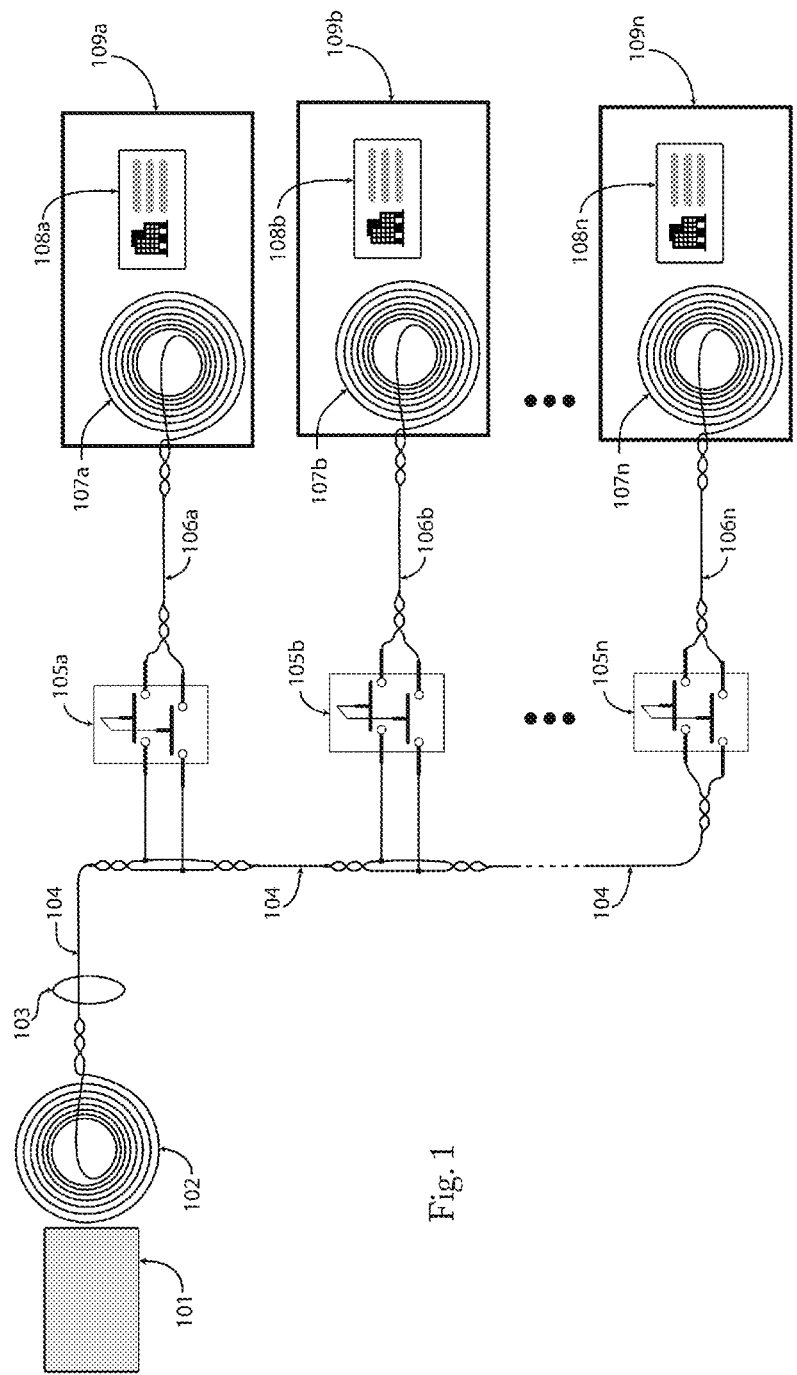
FIG. 1 is a schematic diagram of a system in accordance with an embodiment of the invention.

The invention generally is directed to an access control system, method and device for scanning an RFID input, such as a user credential presented by a user to a scanner such as a reader. The reader may retrieve a user credential, and transmit it to a reader pickup coil via link coupling therebetween, further transmitting the user credential to one or more credential read heads via a link coupling assembly, retrieving an indicium from a credential via link coupling between the credential read head and its respective credential, and transmitting a signal, preferably the indicium, from the credential read head to the reader. The credential is preferably a virtually real credential. A coupling assembly generally comprises a reader pickup, such as a reader pickup coil, connected by a first transmission line to a credential selector switch, wherein the credential selector switch is connected via a second transmission line to a credential read head, such as a credential read coil. Credential selector switch preferably connects or disconnects the first transmission line and the second transmission line, and thus connects or disconnects the credential read head and reader pickup coil.

An embodiment of the invention described herein addresses responsiveness and integration issues by combining two or more readers with switching assemblies to integrate technologies. The switching assemblies are preferably under the control of a tenant access control system, and may be controlled manually, electrically, or both.

Whereas Galvanic connection of equipment from different manufacturers may introduce drawbacks in the marketing or realization of the system, certain embodiments of the invention described herein do not rely upon galvanic connection of building equipment.

Unlike some methods currently available, embodiments of the invention use link coupling to overcome certain drawbacks. The technique of using coils coupled to a transmission line has a long history. One reference to link coupling is in the 1936 edition of *The Radio Antenna Handbook* edited by W. W. Smith. On page 11, diagram "C" shows a link coupling circuit. A more rigorous treatment of the technique is in the 1941 edition of the *Radiotron Designer's Handbook* on pages 125 through 126. This book illuminates the technique shown in FIG. 16 with mathematics on page 139. The 1938 book, *The Radio Handbook* edited by W. W. Smith, which discusses link coupling states on page 282, "It allows the separation between transmitter stages of distances up to several feet without appreciable r.f. losses." However, the technology available in the 1930s for larger transmitters required large heavy equipment typically fixed in physical relationship. The link coupling allowed the 1930s' engineer to build the transmitter in sections, an exciter that generates the modulated RF signal and a final or high power amplifier is one example. Additionally, the application had unidirectional flow, for example, from the exciter to the final transmitter stage. In contrast, an embodiment of the invention allows a bidirectional flow between the reader and the credential.

Several packaging patents employ link coupling to allow the interrogation of RFID tags stacked within various containers. Examples include U.S. Pat. Nos. 7,091,859, 7,180,423 and WO2004107251. U.S. Pat. No. 7,973,662 covers embedding RFID tags into a machine for reading with a portable reader. These patents are directed toward using link coupling to expose an RFID tag or credential embedded in a package, pallet, or machine to a fixed reader, wherein the link coupling are permanently disposed close to the tags in a mobile assembly. That assembly of tags and coupling moves by a reader. In contrast, an embodiment of the invention described herein employs link coupling permanently disposed close to the reader and permanently disposed close to the credential. Furthermore, U.S. Pat. No. 4,112,394 is directed toward link coupling as applied to multiple transmitters tied to a single antenna. In contrast, an embodiment of the invention described herein employs link coupling and a switching assembly to connect one reader to one credential from an array of one or more credentials.

By way of non-limiting example, a user may present their access card having a user credential embedded therein to a reader located by a kiosk, thus entering the near fields of a reader pickup coil proximate the reader. A credential selector switch may be activated, completing the transmission line between the reader pickup coil and the associated credential read head, after which the indicium from the selected credential may be transmitted to the reader. The user is then granted access according to the indicium received by the reader. For example, if the reader is for an elevator system, the user may be granted access to a certain floor or group of floors. If the user is not authorized to access any of the floors, either none of the switches is actuated or the switch associated with a credential indicating no access is actuated, and preferably an indicator, display screen or other alerting mechanism indicates to the user that the user lacks authority.

As described herein, certain embodiments of the invention are directed toward applying link coupling to a fixed reader and fixed credential. For example, an RFID may be a credential, and preferably one end of a link coupling assembly is positioned physically proximate a reader, and the opposite end of the link coupling assembly is positioned physically near a credential.

Reference is made to FIGS. 1 and 4-16, wherein certain exemplary embodiments of the invention are illustrated. In the embodiment shown in FIG. 1, a system includes a reader 101, reader pickup coil 102, reader transmission line 104, credential selector switches 105a, 105b . . . 105n, credential transmission lines 106a, 106b . . . 106n, credential read heads 107a, 107b . . . 107n, credentials 108a, 108b . . . 108n, and housings 109a, 109b . . . 109n which fix credentials 108a, 108b . . . 108n, preferably virtually real credentials, in close proximity to their respective credential read heads 107a, 107b . . . 107n.

As shown in FIG. 1, reader 101 is preferably positioned proximate reader pickup coil 102 to permit the transfer of signals therebetween, preferably via link coupling. Reader transmission line 104 and credential transmission lines 106a, 106b . . . 106n preferably comprise a pair of electrical conductors and permit the transfer of a signal, and preferably also power, between the elements being connected thereby. In the embodiment shown, reader transmission line 104 connects reader pickup coil 102 to credential selector switches 105a, 105b . . . 105n, the credential selector switches 105a, 105b . . . 105n connected in parallel to each other. Credential transmission lines 106a, 106b . . . 106n connect credential selector switches 105a, 105b . . . 105n to credential read heads 107a, 107b . . . 107n, respectively, which are positioned proximate credentials 108a, 108b . . . 108n to permit the transfer of signals therebetween preferably via link coupling. When activated, credential selector switch 105a, 105b . . . 105n preferably connects reader transmission line 104 to its associated credential transmission line 106a, 106b . . . 106n and read head 107a, 107b . . . 107n, thus permitting the transfer of signals such as an indicium, between the reader 101 and the respective credential 108a, 108b . . . 108n corresponding to the activated credential selector switch 105a, 105b . . . 105n. Preferably, credentials 108a, 108b . . . 108n are encased in respective housings 109a, 109b . . . 109n, which maintain credentials 108a, 108b . . . 108n at a fixed distance, preferably in close proximity to credential read heads 107a, 107b . . . 107n. Housings 109a, 109b . . . 109n preferably protect credentials 108a, 108b . . . 108n from the environment as well, and may also encase credential read heads 107a, 107b . . . 107n therein.

Figure 2:
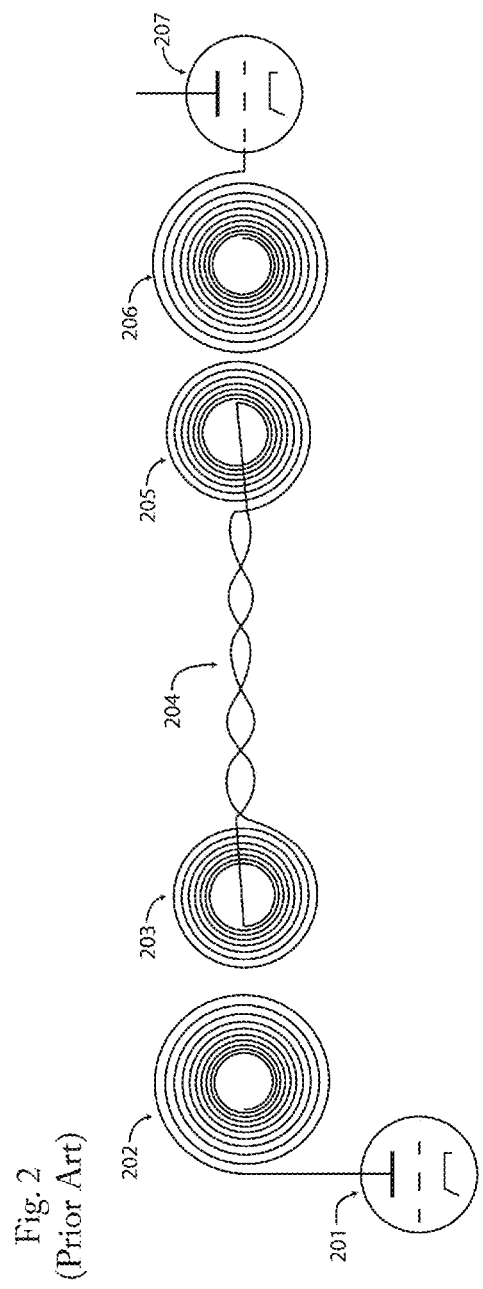
FIG. 2 is an illustration of a prior art link coupling system.
Figure 3:
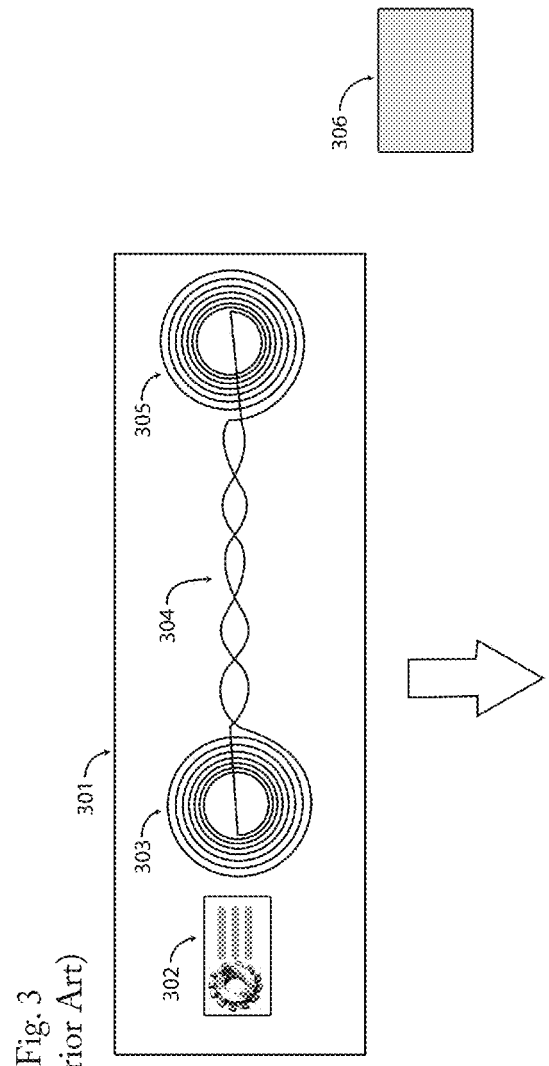
FIG. 3 is an illustration of a prior art RFID package.

Examples of previously known systems and devices are illustrated in FIGS. 2-3. FIG. 2 illustrates an example of a link coupling assembly as described by W. W. Smith, in which plate tank circuit coil 202 of exciter tube 201 is coupled to link coil 203. The transmission line 204 transmits the exciter energy to coil 205. Coil 205 couples that energy to grid coil 206 of the amplifier 207.

In FIG. 3, an RFID tag 302 is deeply embedded in a pallet of material or a machine 301, and the RFID tag 302 is essentially an object credential. Without the link coupling, RFID tag 302 would be out of range of reader 306. The link coupling coil 303 is adjacent to the RFID tag 302 and connects to transmission line 304. The transmission line 304 couples with coil 305 which is located closer to the surface for reader access. As the pallet or machine 301 moves relative to the reader 306, the RFID tag 302 is successfully interrogated. Notably, the RFID tag or credential 302 travels with the link coupling circuit 303, 304 and 304, and the link coupling coil 303 is fixed proximate RFID tag 302. The reader 306 is brought in proximity to the pallet or machine to interrogate the RFID tag 302.

Preferably, the distance between the reader pickup coil 102 and the reader 101 is less than 3 inches, more preferably less than an inch, to permit wireless communication of data therebetween, for example, via electromagnetic coupling.

Figure 7:
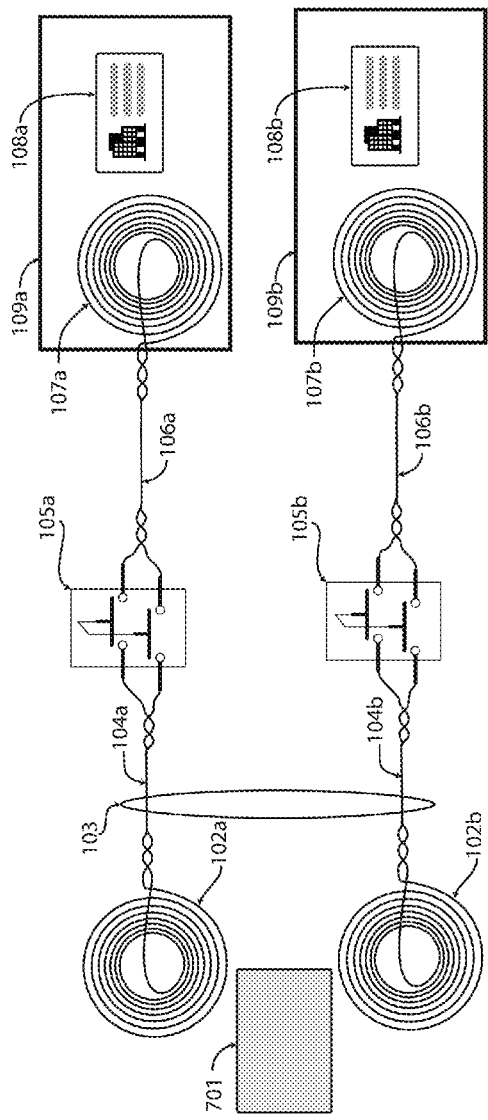
FIG. 7 is a schematic diagram of a system in accordance with an embodiment of the invention having multiple reader technologies.

In accordance with an exemplary embodiment of the invention, reader transmission line 104 is positioned within a cable 103, such as a CAT-5 (category 5) or a CAT-6 (category 6) cable, for example, an Ethernet cable. An industry standard CAT-6 Ethernet cable may be preferred for certain frequencies of interest, such as 125 KHz and 13.58 MHz, which are the most commonly used currently for credentialing applications. The 125 to 130 KHz range is a common range for older proximity credentials and the newer 13.58 MHz Industrial, Scientific, and Medical radio (ISM) band is common for newer credentials. Known as passive credentials, both technologies commonly use energy from the reader to power electronics on the card having the credential indicium therein. Another credential type has an onboard power supply, such as batteries, that power the electronics for longer read ranges. Embodiments of the invention described herein work with either credential type. The CAT-5 or CAT-6 cable may support up to four twisted pairs of insulated conductors. A single ethernet cable may serve more than one reader technology frequency, as illustrated in FIG. 7. Furthermore, more than one credential may be virtually presented to the reader. As is understood by those skilled in the art, the invention is not limited to the examples of cables or frequencies described herein.

An embodiment of the invention may be used with building security, such as one in which a building authority directs a person to an elevator which will take the person to the appropriate floor without requiring the person to select the floor from within the elevator. Preferably, the person is prevented from accessing unauthorized floors.

Figure 4A:
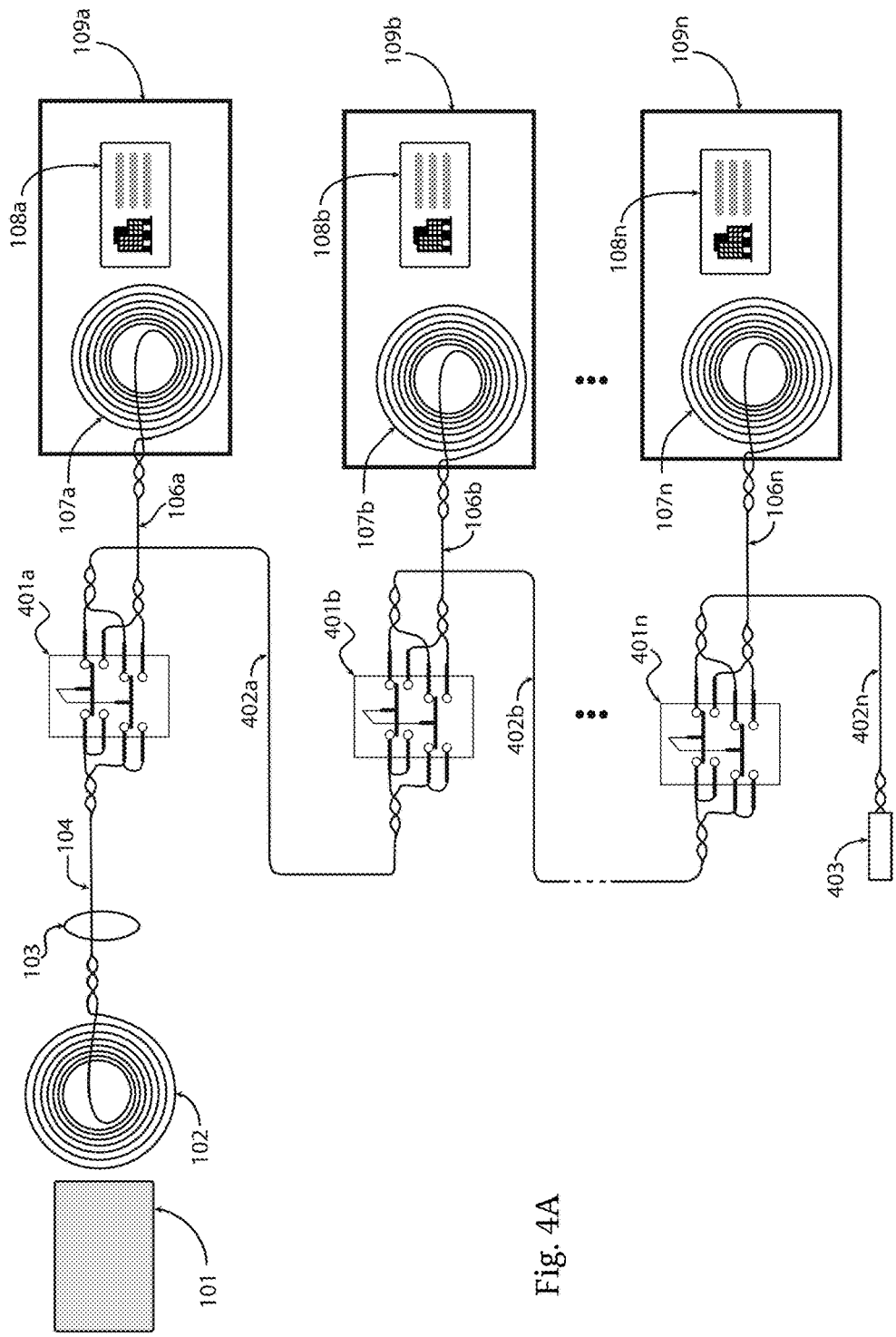
FIG. 4A is a schematic diagram of a system in accordance with an embodiment of the invention.
Figure 4B:
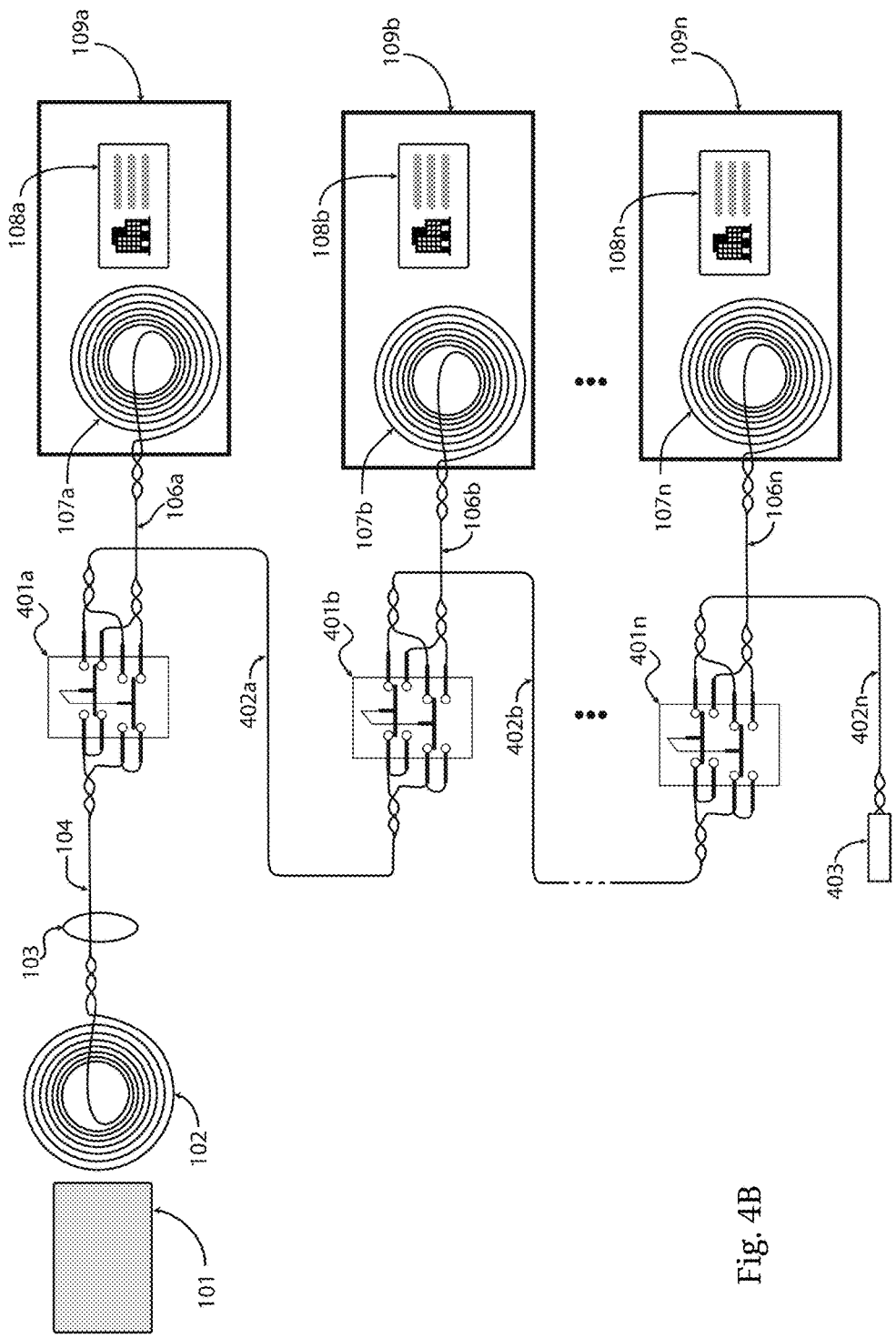
FIG. 4B illustrates the system of FIG. 4 having a first switch in an activated state.
Figure 4C:
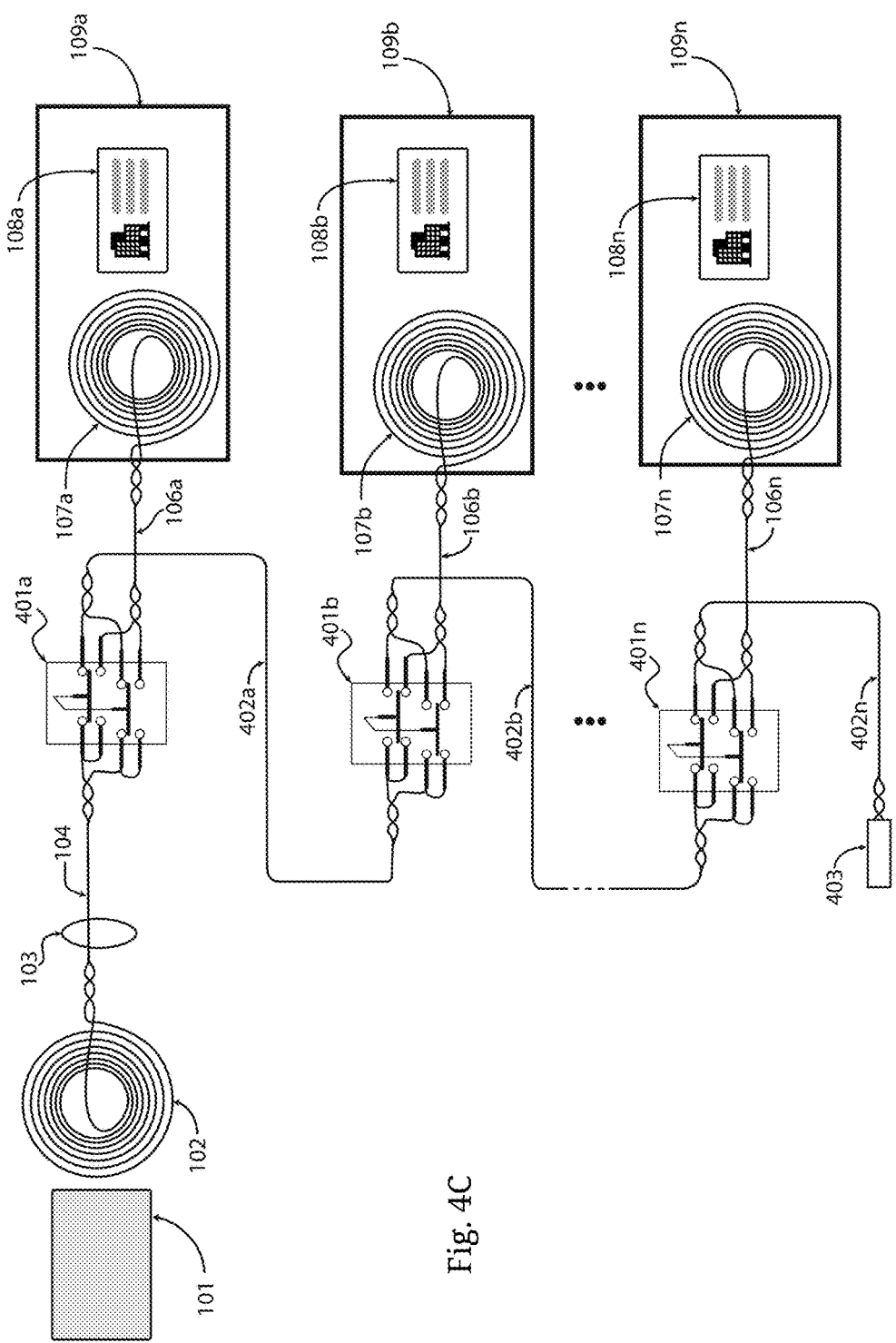
FIG. 4C illustrates the system of FIG. 4 having a second switch in an activated state.

Whereas the embodiment showed in FIG. 1 has credential selector switches 105a, 105b . . . 105n connected in parallel to each other, the embodiment in FIGS. 4A to 4C has credential selector switches 401a, 401b . . . 401n connected in series. In FIG. 4A, credential selector switches 401a, 401b . . . 401n are all in a relaxed state, connecting reader pickup coil 102 to termination 403. More specifically, when relaxed, credential selector switch 401a selects pass through of reader transmission line 104 to reader transmission line 402a, credential selector switch 401b selects pass through of reader transmission line 402a to reader transmission line 402b, and so on. Termination 403 may be, by non-limiting example, an open circuit, a resistor, or other suitable arrangement.

As shown, reader 101 is coupled to reader pickup coil 102, which is connected to reader transmission line 104 connected to reader transmission lines 402a, 402b . . . 402n via credential selector switches 401a, 401b . . . 401n respectively, and eventually termination 403. Thus, reader pickup coil 102 is electrically connected to termination 403 when credential selector switches 401a, 401b . . . 401n are all relaxed. Thus, reader 101 does not receive the indicium from any of the credentials 108a, 108b . . . 108n. If each credential 108a, 108b . . . 108n grants access to a certain floor of a building, the user whose user credential was read by reader 101 is not granted access to any of the floors according to FIG. 4A.

When a certain credential 108a, 108b . . . 108n is selected, its corresponding credential selector switch 401a, 401b . . . 401n is activated, thus connecting reader pickup coil 102 to the selected credential 108a, 108b . . . 108n. For example, in FIG. 4B, credential 108a is selected. Credential selector switch 401a is activated, thus disconnecting reader transmission line 104 from reader transmission line 402a and credential selector switches 401b . . . 401n downstream therefrom, and establishing a path between reader pickup coil 102 and credential read head 107a. More specifically, credential selector switch 401a connects reader transmission line 104 to credential transmission line 106a, which is connected to credential read head 107a, which is coupled with credential 108a. Thus, reader 101 may retrieve the indicium from credential 108a.

FIG. 4C illustrates the embodiment wherein credential selector switch 401a is relaxed, and credential selector switch 401b is activated. Thus, a path is established between reader pickup coil 102 and credential read head 107b. More specifically, reader transmission line 104 connects to reader transmission line 402a through credential selector switch 401a, which is relaxed. Reader transmission line 402a connects to credential selector switch 401b, which connects to credential transmission line 106b, which in turn connects to credential read head 107b. Reader transmission line 402b . . . 402n and termination 403 are not connected to reader transmission lines 104, 402a, and thus is not connected to reader pickup coil 102.

Generally, when a credential selector switch 401a, 401b . . . 401n is activated, its corresponding credential read head 107a, 107b . . . 107n is connected and the remaining credential read heads 107a, 107b . . . 107n are not connected. Thus, only one credential 108a, 108b . . . 108n is active at a time, which may be preferred.

Whereas FIGS. 1, 4A to 4C illustrate examples of a switch arrangement in parallel or in series, it is to be understood that other switch arrangements are contemplated without deviating from the scope of the invention. For example, the switch arrangement may include a combination of series and parallel connections.

FIG. 5 illustrates an exemplary tenant access system interrogation system having one tenant and thus one virtually real credential, wherein a tenant access control system 504 is controlled by a virtually real tenant. In the embodiment, system 501 is a secure elevator dispatch system, and has the indicium of the virtually real credential 108 programmed with some or all of the virtually real tenant's access rights to the dispatch system 501. If a user presents a user credential to reader 101, reader 101 may interrogate the user credential, obtain its user indicium and pass it as a signal via cable 503 to dispatch system 501. If the indicium is known to dispatch system 501, the dispatch system 501 presents the user with a floor or set of floors accessible via the elevator from which the user may select the desired destination.

Alternatively, if the user is a tenant's employee or other person known by tenant access control system 504 and not by dispatch system 501, the signal would preferably travel through credential selector switch 502. As illustrated, reader pickup coil 102 is located in close proximity to and coupled with reader 101, and is connected via reader transmission line 104 to credential selector switch 502. Reader transmission line 104 may be within a CAT-6 cable 103. Credential selector switch 502 is connected via credential transmission line 106 to credential read head 107, credential read head 107 being in close proximity to and coupled with credential 108. Preferably, housing 109 maintains credential 108 in close proximity to credential read head 107, and more preferably houses credential 108 or credential 108 and credential read head 107.

A tenant credential reader 505 may be connected to the tenant access control system 504 via reader cable 506. In the illustrated embodiment, if a user, such as a tenant employee or other authorized personnel of the tenant, presents a valid user credential 507 known by the tenant access control system 504, tenant access control system 504 activates credential selector switch 502. More specifically, tenant access control system 504 activates circuit 509a, which energizes coil 509 to activate credential selector switch 502. When credential selector switch 502 is in the relaxed, deenergized state, reader transmission line 104 is not connected to credential transmission line 106, and the dispatch system 501 does not have access to credential 108. However, when credential selector switch 502 is activated, the credential selector switch 502 connects reader transmission line 104 to credential transmission line 106, thus completing the circuit between the reader pickup coil 102 and credential read head 107. Therefore, reader 101 may retrieve the indicium from credential 108, and dispatch system 501 responds as if credential 108 had been presented directly to reader 101. For example, the user may be presented with access to the floors accessible to the tenant or granted other authority available to the tenant. As illustrated, the user may be granted such access or authority without the tenant disclosing the identity of the user or the association of the indicium held by the user credential 507 of the user, thus maintaining information about the tenant's employees and other authorized personnel confidential.

In accordance with a preferred embodiment, tenant credential reader 505 is located proximate reader 101. Alternatively, tenant credential reader 505 and reader 101 may be the same reader. Wiegand splitters or methods taught by U.S. Pat. Nos. 8,370,911, 9,019,071, and 9,165,123 may be used to distribute the presented credential indicia from the reader 101 to the tenant access control system 504. Additionally, certain embodiments of readers have multiple outputs that allow connection to legacy systems by de facto security standards.

Whereas FIG. 5 illustrates an embodiment having a single tenant access control system 504, more than one tenant access systems may be provided. Preferably, each tenant access system has its own tenant credential reader and credential selector switch to connect the reader pickup coil to its respective credential. Whereas the credential selector switch 502 illustrated is an electromechanical relay, it may be any suitable controlled switching element. Furthermore, whereas system 501 illustrated is an elevator dispatch system, system 501 may be used in other locations having an RFID reader.

FIG. 6 illustrates an embodiment of a credential read head having two coils 601, 602. The coils 601, 602 are wired in series and connected to credential transmission line 106. This arrangement is called a Helmholtz coil. As shown, the credential 108 is physically positioned between the two coils 601, 602. This arrangement may improve the signal from the credential 108 to the credential transmission line 106 by focusing the magnetic lines of flux through the credential 108. Therefore, such an arrangement may improve performance of a credential and/or reader coupled to the coils.

A multi-frequency system is illustrated in FIG. 7, in which the system supports credentials 108a, 108b of varying frequencies. Reader 701 is a multi-frequency reader, and is located proximate two or more reader pickup coils 102a, 102b, each for a different frequency. For example, credential 108a may be a 125 KHz proximity card, and credential 108b may be a 13.56 MHz proximity card. Reader pickup coil 102a is connected to credential selector switch 105a via reader transmission line 104a, and credential selector switch 105a is connected to credential read head 107a via credential transmission line 106a in the illustrated embodiment.

Credential 108a is disposed proximate credential read head 107a, preferably by housing 109a. When credential selector switch 105a is activated, for example, when a user presents a user credential of the same frequency as credential 108a, a path is established from reader pickup coil 102a to credential read head 107a via reader transmission line 104a and credential transmission line 106a. Credential read head 107a may retrieve the indicium from credential 108a and relay it to reader pickup coil 102a, and thus to reader 701. Likewise, when credential selector switch 105b is activated, for example, when a user presents a user credential of the same frequency as credential 108b, a path is established from reader pickup coil 102b to credential read head 107b via reader transmission line 104b and credential transmission line 106b. Credential read head 107b may retrieve the indicium from credential 108b and relay it to reader pickup coil 102b, and thus to reader 701. In the embodiment shown, reader transmission lines 104a, 104b are located within a CAT-6 cable 103. Preferably, a single credential selector switch 105b is activated at a time.

A multi-frequency system such as the illustrated embodiment may be desirable when tenants use different frequencies for their credentials. Rather than providing an entire system for each frequency, a multi-frequency system may be more functionally efficient, space-efficient, and aesthetically pleasing by providing a single reader, rather than a different reader for each frequency. Whereas the embodiment is illustrated with credentials 108a, 108b, one for each frequency, multiple credentials may be provided for one or more frequency. More specifically, reader pickup coil 102a and/or reader pickup coil 102b may be connected to multiple credential selector switches and credentials, either utilizing an embodiment described herein or other arrangement. Furthermore, whereas the embodiment in FIG. 7 is illustrated for two frequencies, the system may be modified to work with more frequencies.

Figure 8:
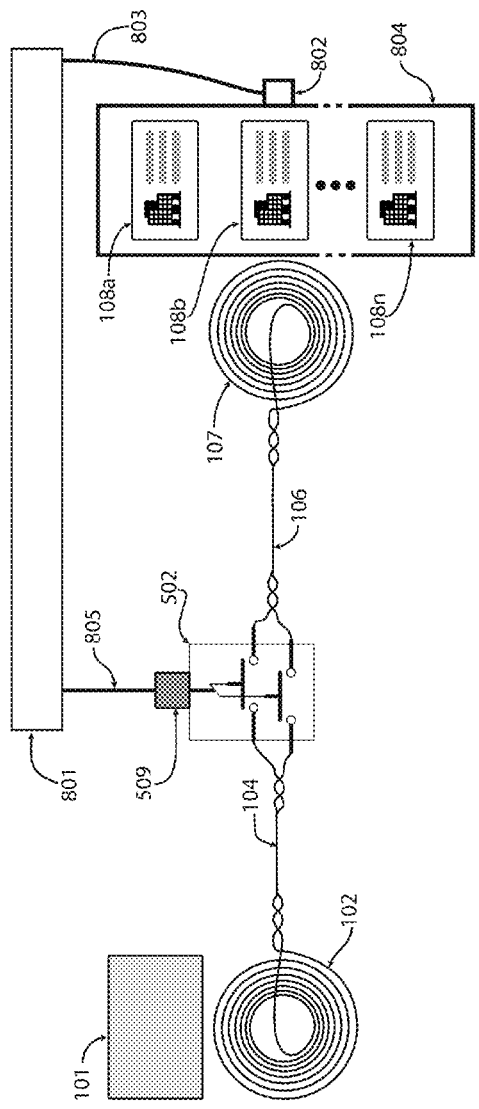
FIG. 8 is a schematic diagram of a system in accordance with an embodiment of the invention having a credential carousel.

Reference is made to FIG. 8, wherein an embodiment of the invention is shown having an automated testing mechanism for testing credentials 108a, 108b . . . 108n. Controller 801 controls a motor 802 via circuit 803. Controller 801 also activates coil 509 via circuit 805 to activate credential selector switch 502. When credential selector switch 502 is activated, it connects reader transmission line 104 to credential transmission line 106. In an exemplary operation, controller 801 issues a command to motor 802 via circuit 803 to select one of the credentials 108a, 108b . . . 108n by displacing housing 804 with respect to credential read head 107 to place the selected credential 108a, 108b . . . 108n proximate credential read head 107, so that the selected credential 108a, 108b . . . 108n may couple with credential read head 107 via link coupling. Controller 801 further issues a command via circuit 805 to activate coil 509 once the selected credential 108a, 108b . . . 108n is in position proximate credential read head 107. Activating coil 509 activates credential selector switch 502, thus connecting credential read head 107 to reader pickup coil 201. Reader 101 may then retrieve the indicium from the selected credential 108a, 108b . . . 108n. Embodiments of housing 804 include, but are not limited to, a robotic arm, assembly conveyor, or other structure to physically position the selected credential 108a, 108b . . . 108n proximate credential read head 107. Whereas the credential selector switch 502 is illustrated as an electromechanical relay, other controlled switching elements may be used without deviating from the scope of the invention.

Figure 9:
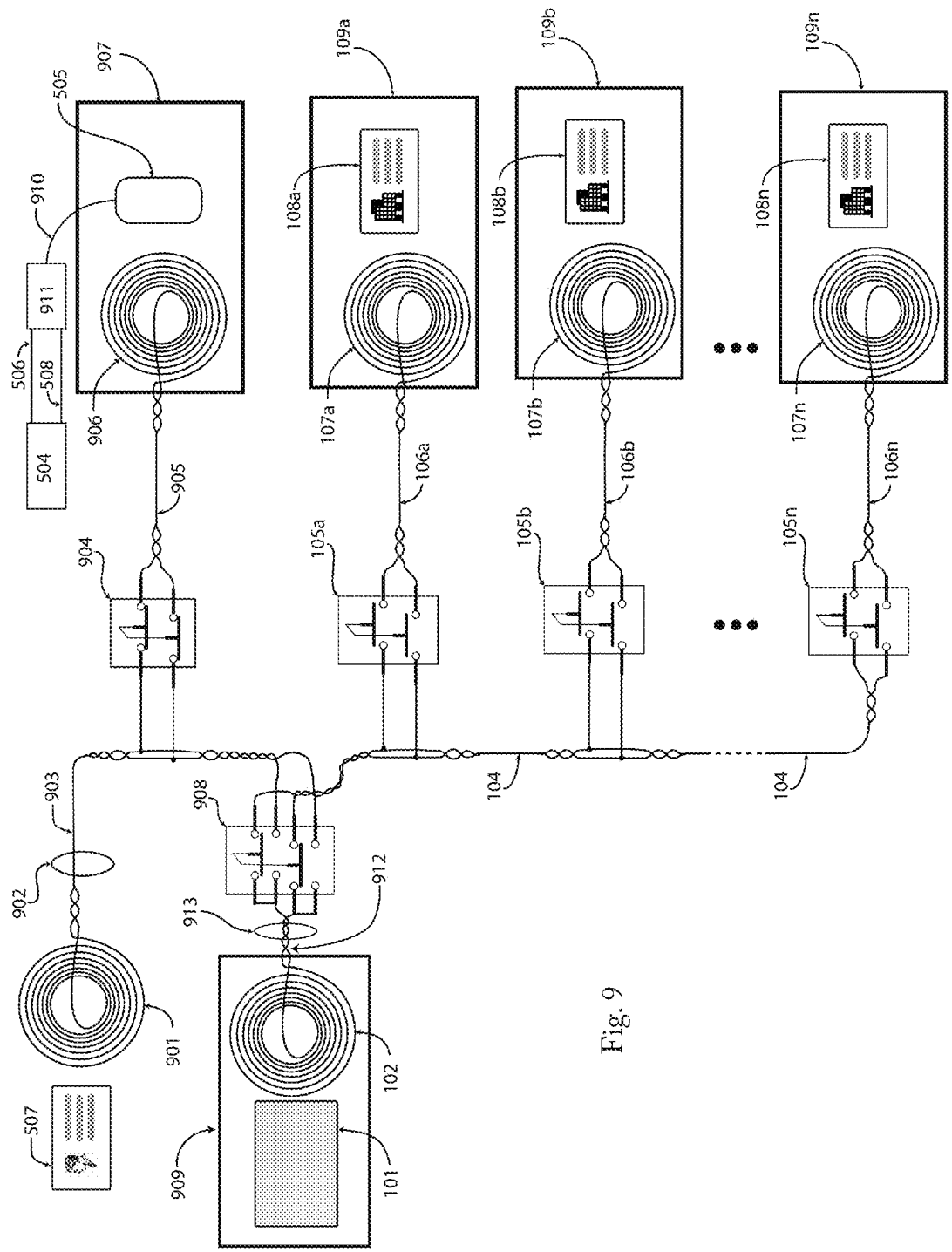
FIG. 9 is a schematic diagram of a system in accordance with an embodiment of the invention having a control system.

Reference is made to FIG. 9, which illustrates an embodiment of the invention having a coordinating system 911 connected via reader cable 506 and control cable 508 to tenant access control system 504. A dispatch system reader assembly 909 houses reader pickup coil 102, which is a dispatch reader pickup coil, positioned proximate reader 101, which is an elevator dispatch system reader. Dispatch system reader assembly 909 is connected to a public reader pickup 901 via reader transmission line 903. Reader transmission line 903 is preferably a twisted pair of wires, for example, a pair within a CAT-6 cable 902. Preferably, dispatch system reader assembly 909 shields reader 101 from public access.

In the illustrated embodiment, reader transmission line 903 is also connected to a tenant reader assembly 907 via tenant reader transmission line 905 through tenant reader switch 904 which connects tenant reader transmission line 905 to reader transmission line 903 when tenant reader switch 904 is not activated, as illustrated. Thus, when tenant reader switch 904 is relaxed, tenant credential reader pickup 906 is connected to public reader pickup 901. When tenant reader switch 904 is activated, tenant reader transmission line 905 is disconnected from reader transmission line 903, and thus from public reader pickup 901. Tenant reader assembly 907 maintains a tenant credential reader 505 in close proximity to the tenant credential reader pickup 906, which is connected to tenant reader transmission line 905 as illustrated.

As shown, dispatch system reader assembly 909 may connect to a credential 108a, 108b . . . 108n via reader transmission line 104 and its respective credential selector switch 105a, 105b . . . 105n. In the embodiment shown, credentials 108a, 108b . . . 108n are connected in series to reader transmission line 104, but other arrangements are contemplated without deviating from the scope of the invention. Preferably, when credential selector switches 105a, 105b . . . 105n are not activated, their associated credentials 108a, 108b . . . 108n are not connected to reader transmission line 104. Preferably, credentials 108a, 108b . . . 108n and their associated credential read heads 107a, 107b . . . 107n are housed within housings 109a, 109b . . . 109n, which preferably provides shielding. It may also be preferable to provide shielding to dispatch system reader assembly 909 and/or tenant reader assembly 907.

Reader transmission lines 903, 104 are connected to reader pickup coil 102 through dispatch system switch 908 and dispatch transmission line 912 in the illustrated embodiment. Dispatch transmission line 912 is preferably a pair of twisted wires within a CAT-6 cable 913. When dispatch system switch 908 is relaxed, as shown in FIG. 9, reader pickup coil 102 is connected to reader transmission line 104, and thus, is not connected to public reader pickup 901 and tenant credential reader pickup 906. When dispatch system switch 908 is activated, reader transmission line 104 is not connected, and reader 101 is in communication with public reader pickup 901 via reader transmission line 903.

Coordinating system 911 is connected via reader cable 910 to tenant credential reader 505, and controls tenant reader switch 904, dispatch system switch 908, as well as credential selector switches 105a, 105b . . . 105n. When all the switches 904, 908, 105a, 105b . . . 105n are relaxed, as illustrated, public reader pickup 901 is connected to tenant credential reader pickup 906, but not to reader pickup coil 102, and reader pickup coil 102 is connected to reader transmission line 104 but not to credentials 108a, 108b . . . 108n.

Figure 10:
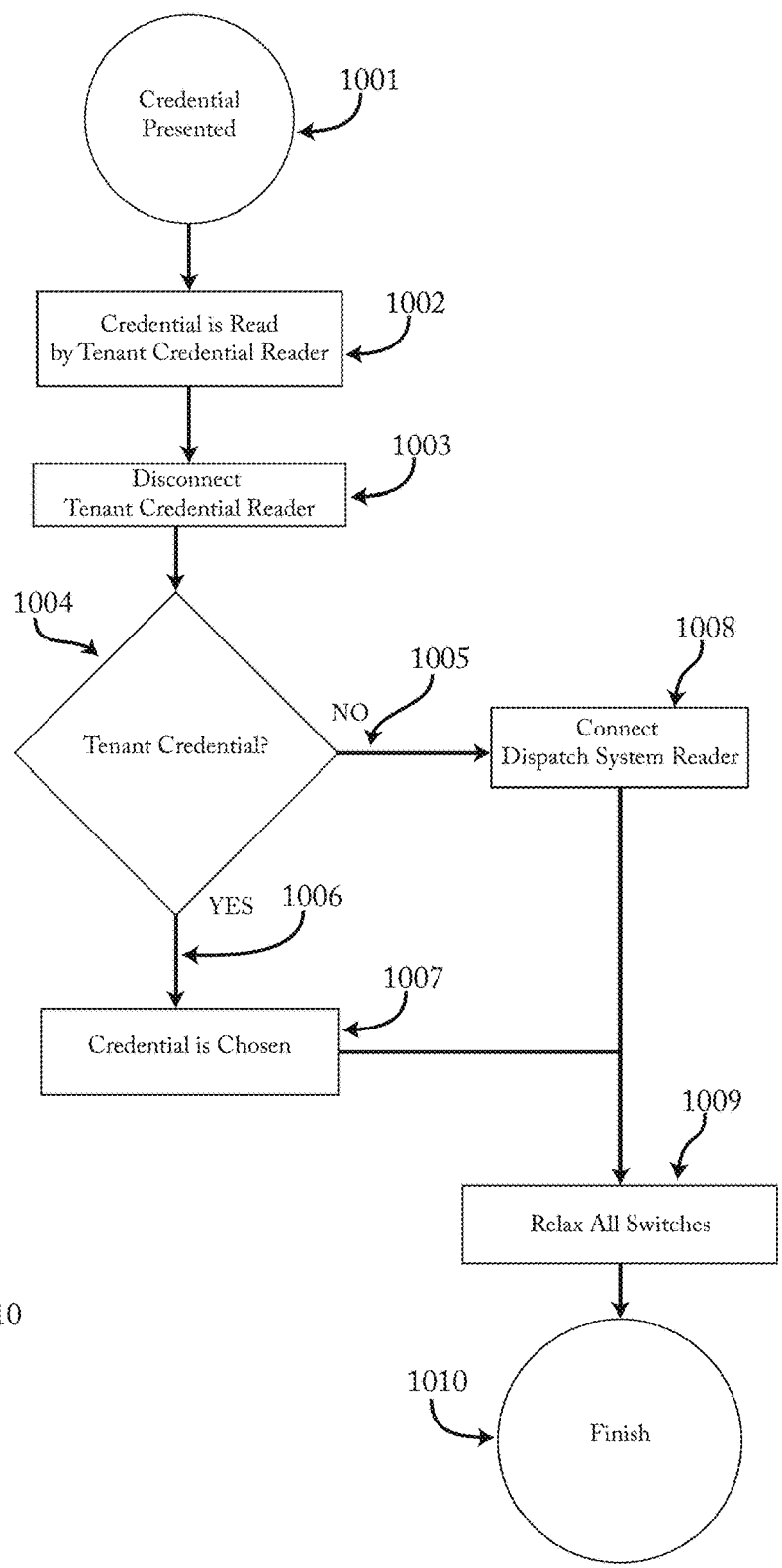
FIG. 10 is a flow diagram illustrating the operation of a system in accordance with an embodiment of the invention.

An exemplary operation of the embodiment of FIG. 9 is illustrated in a flow chart in FIG. 10. A user credential 507 is brought within range of public reader pickup 901 in step 1001. Tenant credential reader 505 interrogates and interprets user credential 507 in step 1002. Tenant reader switch 904 is activated in step 1003, thus disconnecting tenant reader assembly 907 from reader transmission line 903 and public reader pickup 901 until the transaction is completed. Coordinating system 911 then determines whether user credential 507 could be a tenant credential. It may make this determination based on the credential's facility code or any suitable pattern of bits in or the bit count of the indicium of the tenant credential.

If coordinating system 911 determines that user credential 507 is not a tenant credential, the NO branch 1005 is selected, followed by step 1008, activating dispatch system switch 908 and thus connecting the dispatch system reader pickup 102 to public reader pickup 901 via reader transmission line 903. Therefore, dispatch system reader 101 may interrogate user credential 507. In step 1009, all switches that were activated and not subsequently deactivated, namely, tenant reader switch 904 and dispatch system switch 908, are deactivated and return to their relaxed state. The system returns to waiting for a user credential to be presented in step 1010.

If coordinating system 911 determines that user credential 507 could be a tenant credential, the YES branch 1006 is selected. Then, tenant access control system 504 selects none or one of the virtually real credentials 108a, 108b . . . 108n to be connected to dispatch system reader 101 in step 1007. Tenant access control system 504 relays the selection via control cable 508 to coordinating system 911. If no credential is selected, coordinating system 911 will not activate dispatch system switch 908 or any credential selector switch 105a, 105b . . . 105n. Therefore, dispatch system reader 101 will not interrogate any credential, and the user is not granted access to the floor, area, equipment, etc. associated therewith. An alternate arrangement for denying access to non-authorized users may be to activate a credential selector switch 105a, 105b . . . 105n to permit interrogation of a credential 108a, 108b . . . 108n programmed for no access.

If the user is authorized personnel of a tenant, such as an employee, the appropriate tenant's credential 108a, 108b . . . 108n is selected. More specifically, coordinating system 911 does not activate dispatch system switch 908, and activates credential selector switch 105a, 105b . . . 105n associated with the selected credential 108a, 108b . . . 108n. Thus, dispatch system reader 101 may interrogate the selected credential 108a, 108b . . . 108n and grant the user appropriate access defined by credential 108a, 108b . . . 108n. In step 1009, all switches that were activated and not subsequently deactivated are deactivated and return to their relaxed state. More particularly, tenant reader switch 904 and the selected credential selector switch 105a, 105b . . . 105n, if any, are deactivated. The system returns to waiting for a user credential to be presented in step 1010.

It may be preferred to position tenant credential reader 505 in close proximity to reader 101. More preferably, public reader pickup 901 and tenant credential reader 505 are located in close proximity to reader 101, preferably with sufficient shielding between readers, more preferably between reader assemblies. The virtually real credential assemblies within housings 109a, 109b . . . 109n preferably also include shielding.

As one of ordinary skill in the art would appreciate, coordinating system 911 may be incorporated into an access control system. Furthermore, a Wiegand splitter or other methods known in the art may be used to distribute presented credential indicia from the tenant credential reader 505 to multiple tenant systems.

Whereas credential selector switches 105a, 105b . . . 105n are illustrated as being connected to reader transmission line 104 in parallel, they may be arranged in series as illustrated in FIG. 4, a combination of series and parallel, or other suitable arranged desired. The method described herein is not limited to secure elevator dispatch systems but may be used elsewhere, for example, anywhere an RFID reader is deployed. Other alterations may be made, for example, tuning a circuit and neutralizing one or more credential transmission lines 106a, 106b . . . 106n and/or credential read heads 107a, 107b . . . 107n with series and/or parallel capacitors, resistors, inductors or combinations of elements, which may improve performance.

In an embodiment of the invention, the potential credential choices are limited to the virtually real credentials 108a, 108b . . . 108n, and thus dispatch system switch 908 is replaced with a direct connection between reader transmission line 104 and dispatch system pickup 102.

Figure 12:
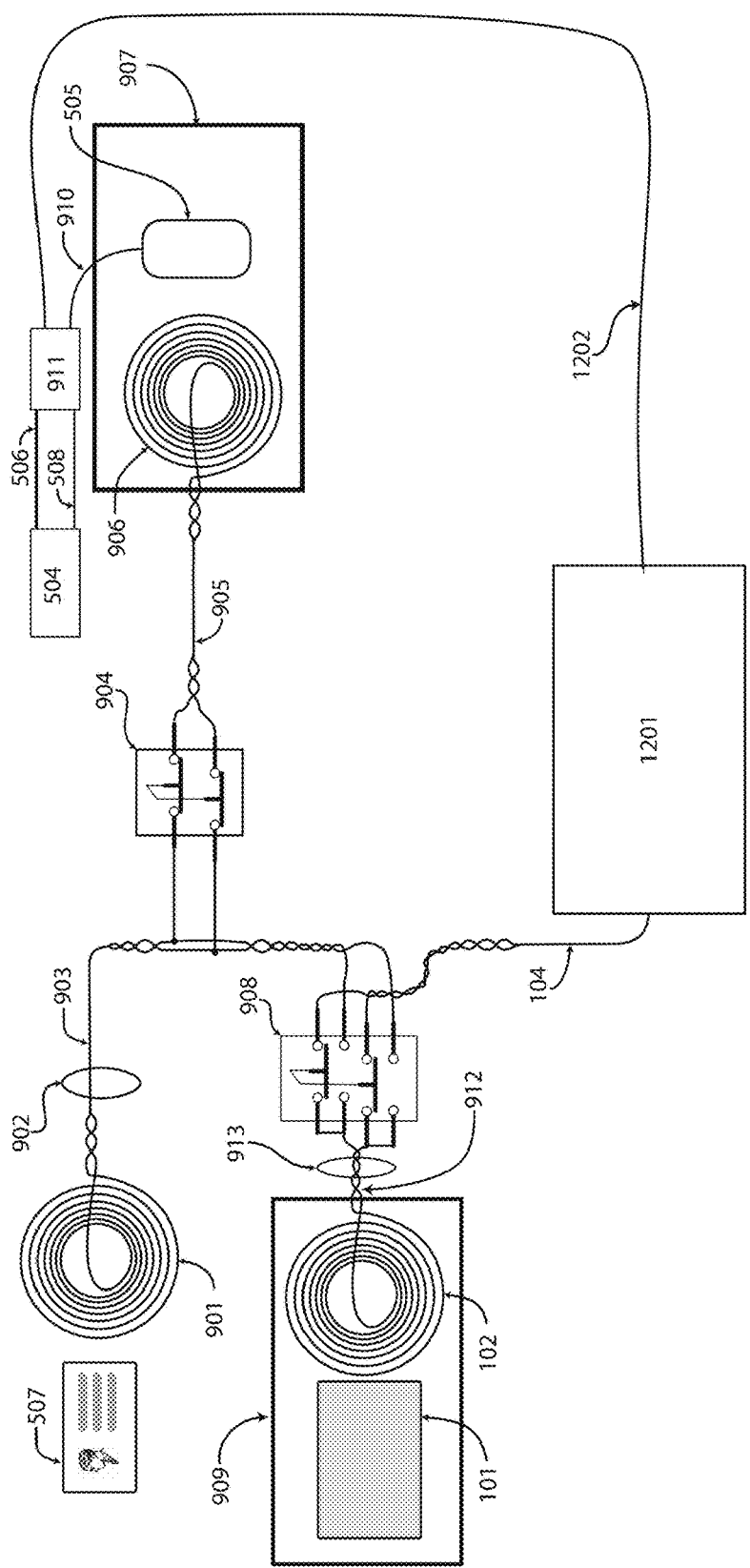
FIG. 12 is a schematic diagram of a system in accordance with an embodiment of the invention having a credential synthesizer.

In yet another embodiment of the invention, credential selector switches 105a, 105b . . . 105n, credential transmission lines 106a, 106b . . . 106n, credential read heads 107a, 107b . . . 107n, credentials 108a, 108b . . . 108n, and housings 109a, 109b . . . 109n may be replaced with a credential synthesizer, which reproduce the signals and responses of actual credentials to the dispatch system reader 101 as directed by coordinating system 911. Such an embodiment is illustrated in FIG. 12 and described below.

Figure 11:
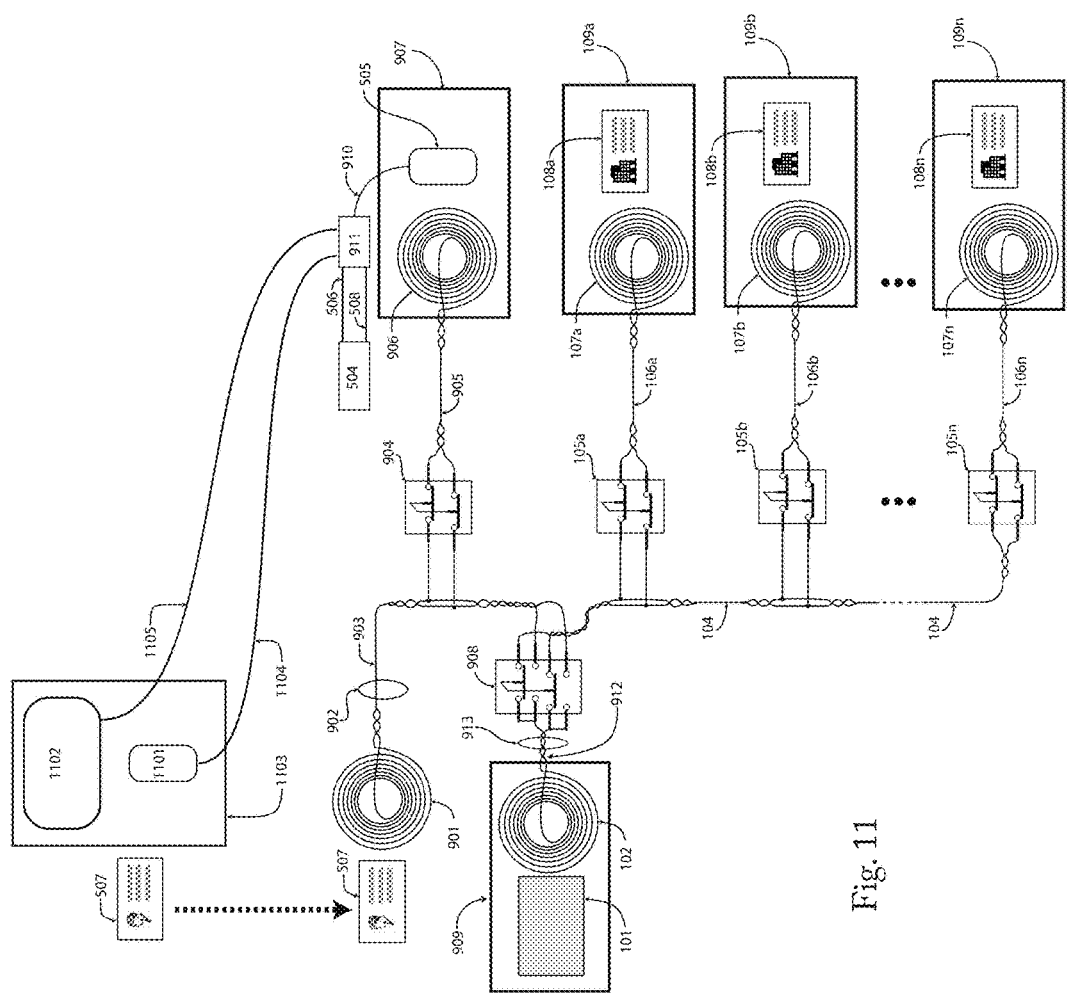
FIG. 11 is a schematic diagram of a system in accordance with an embodiment of the invention having a control system and a display device.

Reference is made to the embodiment of the invention illustrated in FIG. 11, having a user interfacing device, such as a kiosk 1103. In the embodiment shown, kiosk 1103 includes a kiosk credential reader 1101 connected via cable 1104 to coordinating system 911, and a kiosk interface 1102 connected via cable 1105 to coordinating system 911. Kiosk interface 1102 may be, by non-limiting example, a touch screen display, a screen and input mechanism assembly, or other suitable interface.

In accordance with an exemplary use of the embodiment illustrated in FIG. 11, reader 101 is an elevator dispatch system reader, and reader pickup 102 is a dispatch system reader pickup. A dispatch system reader assembly 909 includes reader 101 and reader pickup 102 positioned in close proximity to reader 101 to permit coupling therewith. Preferably, reader 101 and reader pickup 102 are shielded from public access.

Certain elevator dispatch systems, for example as described in U.S. Pat. No. 7,353,915, incorporate floor section and elevator direction for authorized personnel such as the tenant employee into turnstiles controlling access to the elevator lobby. However, the limited space available in the building lobby and the cost of such turnstiles may limit the use of such systems. Therefore, it may be preferred to permit floor selection prior to approaching the turnstiles into the respective elevator lobby. In accordance with an embodiment of the invention, a user, such as a tenant employee, is granted access to an authorized floor and is directed to the appropriate turnstile to access the elevator to that authorized floor.

An exemplary use of an embodiment of the invention illustrated in FIG. 11 is described herein. A tenant employee approaches a kiosk, presents a valid user credential, and is presented with a set of floors which he may access, based on his user credential. The tenant employee chooses a destination floor, and the system associates that choice with that credential. When the tenant employee thereafter presents his user credential to the turnstile, the virtually real credential programmed for his floor choice is presented to the elevator dispatch system. The elevator dispatch system informs the tenant employee of the elevator cab going to his floor choice and releases the turnstile. If a building employee approaches the turnstile with a building credential rather than a tenant credential, the turnstile read head is connected to the pickup coil associated with the elevator dispatch reader directly, and the normal operation of the elevator dispatch system is followed.

Kiosk 1103 is preferably located outside of the elevator lobby, so that kiosk credential reader 1101 may read the user credential prior to the user approaching the turnstile as mentioned above. An exemplary operation of the embodiment of the system is described herein. When a user presents user credential 507 to kiosk credential reader 1101, the indicium from user credential 507 is transmitted by cable 1104 to coordinating system 911. Coordinating system 911 requests from tenant access control system 504 the set of floors user credential 507 is authorized to access. Once received, coordinating system 911 relays the data regarding the authorized set of floors to kiosk interface 1102 via cable 1105, thus presenting the authorized set of floors to the users. If the user is granted access to multiple floors, the user may select the destination floor via kiosk interface 1102. For example, if kiosk interface 1102 is a touch screen, the user may tap the desired floor on the screen. The user is then directed to the appropriate turnstile, for example, by arrows, turnstile number, or other suitable means. The user then presents user credential 507 to public reader pickup 901 located proximate the turnstile. Preferably, coordinating system 911 remembers the floor selection made at kiosk interface 1102, and presents the associated credential 108a, 108b . . . 108n to the elevator dispatch system reader 101. Preferably, when user credential 507 is presented to public reader pickup 901, the system follows generally the same process as the embodiment illustrated in FIG. 9 and described in FIG. 10. However, in this embodiment of FIG. 11, after step 1006, tenant access control system 504 verifies that the credential is still valid by communicating the choice over cable 508 to coordinating system 911. Coordinating system 911 remembers the floor selection and actuates the associated credential selector switch 105a, 105b . . . 105n, if any. If the user did not select a floor at kiosk 1103 prior to accessing the turnstile, a credential with the authorized floors is presented to the dispatch system.

Coordinating system 911 may be combined with tenant access control system 504, kiosk 1103, or both. Furthermore, embodiments of the invention may be applied to access controlled doors, mantraps, or other security portal control systems without deviating from the scope of the invention. Certain embodiments may be used to control other forms of transport, by way of non-limiting example, to direct pedestrian traffic to trains, buses, aircraft, etc.

Referring to the embodiment illustrated in FIG. 12, a credential synthesizer 1201 replaces credential selector switches 105a, 105b . . . 105n, credential transmission lines 106a, 106b . . . 106n, credential read heads 107a, 107b . . . 107n, credentials 108a, 108b . . . 108n, and housings 109a, 109b . . . 109n, and is connected to reader transmission line 104. Credential synthesizer 1201 reproduces signals and responses of actual credentials to the dispatch reader 101. More specifically, a credential is electronically synthesized under control of coordinating system 911 over cable 1202.

The flow diagram of FIG. 10 also applies to this embodiment of FIG. 12, similar to FIG. 9. However, after step 1006, after tenant access control system 504 selects none or one of the credentials to be presented to reader 101, and communicates the choice to coordinating system 911, credential synthesizer 1201 synthesizes the credential and presents it to reader 101 in step 1007. If the user is granted no access to the equipment associated with reader 101, either no credential is synthesized, or a virtual credential programmed for no access is synthesized.

Figure 13:
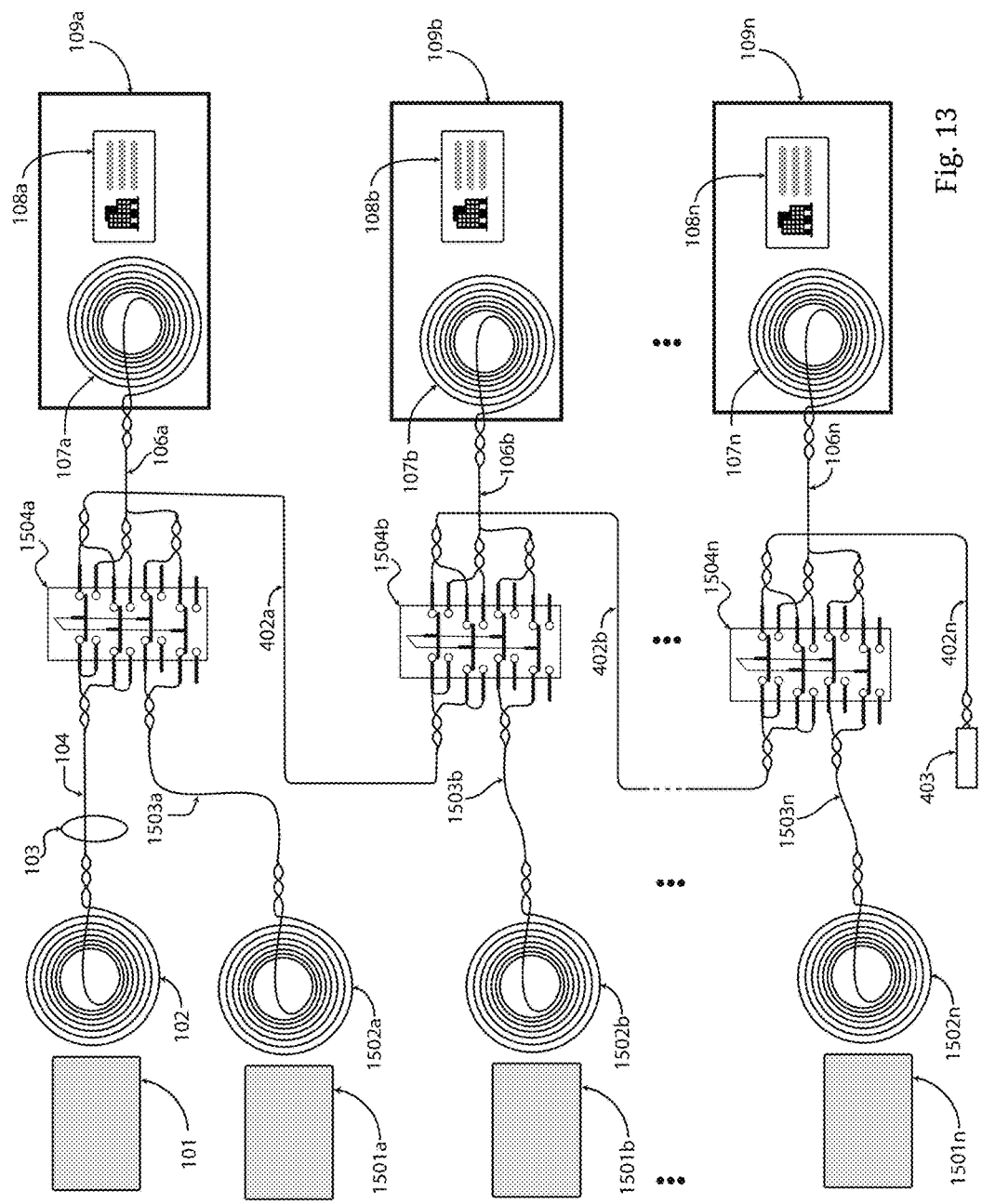
FIG. 13 is a schematic diagram of a system in accordance with an embodiment of the invention having a tamper monitoring mechanism.

It may further be advantageous to monitor the credentials 108a, 108b . . . 108n to guard against theft or tampering. The position of credentials 108a, 108b . . . 108n may be monitored by techniques known in the art, such as tamper switches as videos cameras. An embodiment of a novel method and system for monitoring the position of credentials 108a, 108b . . . 108n is illustrated in FIG. 13. More specifically, FIG. 13 generally illustrates the embodiment of FIG. 4 modified to include a tampering mechanism, wherein credential selector switches 105a, 105b . . . 105n are replaced with four pole double throw switches 1504a, 1504b . . . 1504n. Each switch 1504a, 1504b . . . 1504n selectively connects the respective reader transmission lines 104, 402a, 402b . . . 402n between which switch 1504a, 1504b . . . 1504n is located, preferably when switch 1504a, 1504b . . . 1504n is relaxed. When activated, switch 1504a, 1504b . . . 1504n connects the associated credential transmission line 106a, 106b . . . 106n as described with reference to FIG. 4.

However, each switch 1504a, 1504b . . . 1504n further connects its respective tamper reader 1501a, 1501b . . . 1501n to its respective credential transmission line 106a, 106b . . . 106n, preferably when switch 1504a, 1504b . . . 1504n is relaxed. Therefore, during idle times when credentials 108a, 108b . . . 108n are not being read by reader 101, credentials 108a, 108b . . . 108n may be monitored or interrogated by tamper readers 1501a, 1501b . . . 1501n. For example, when switch 1504a is relaxed, tamper reader 1501a communicates through tamper reader pickup coil 1502a, tamper transmission line 1503a, two contacts of switch 1504a, preferably the lower two contacts of switch 1504a, to credential read head 107a via credential transmission line 106a. If credential 108a is moved out of range of credential read head 107a, an alarm would signal to indicate tampering. Credentials 108b . . . 108n may be monitored for tampering in the same or similar manner by their respective tamper readers 1501b . . . 1501n, tamper reader pickup coils 1502b . . . 1502n, switches 1504b . . . 1504n, credential transmission lines 106b . . . 106n, and credential read heads 107b . . . 107n.

When switch 1504a is activated, credential transmission line 106a is disconnected from tamper transmission line 1503a and is placed in communication with reader pickup coil 102, via reader transmission line 104. Similarly, when switch 1504b is activated, switch 1504a is relaxed, so that reader transmission line 402 is connected to reader transmission line 104. Credential transmission line 106b is disconnected from tamper transmission line 1503b and is placed in communication with reader pickup coil 102 via reader transmission line 104, allowing reader 101 to communicate with credential 108b. Likewise, when switch 1504n is activated, all other switches are relaxed and credential transmission line 106n is disconnected from tamper transmission line 1503n and is placed in communication with reader pickup coil 102, allowing reader 101 to communicate with credential 108n. In accordance with an embodiment of the invention, tamper transmission lines 1503a, 1503b . . . 1503n are part of a Cat-6 cable.

Figure 14:
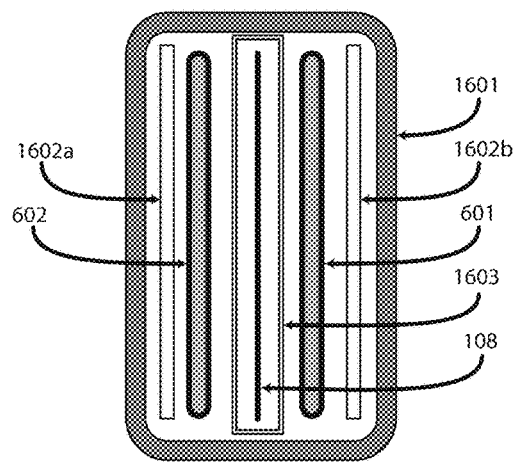
FIG. 14 is an illustration of a shield for a virtually real credential.

FIG. 14 illustrates an embodiment of a shield 1601 for shielding coils 601, 602. Virtually real credential 108 is supported by a structure 1603 which maintains credential 108 in a fixed position with respect to coils 601, 602, preferably between coil 601 and coil 601. Structure 1603 preferably also protects coils 601, 602 from damage when credential 108 is inserted, removed, replaced, etc. In the embodiment shown, spacer 1602a maintains a fixed distance between coil 602 and shield 1601, and spacer 1602b maintains a fixed distance between coil 601 and shield 1601. Spacers 1602a, 1602b and structure 1603 are preferably formed from electromagnetically transparent material and do not create interference. Shield 1601 may be formed from sheet metal or other material having magnetic shielding properties at the operating frequency of credential 108. Shield 1601 may have a shunting effect on the magnetic lines of force generated by coils 601, 602, which may reduce the signal strength when a reader interrogates credential 108. Therefore, coils 601, 602 are preferably wired as Helmholtz coils as shown in FIG. 6, which may align the magnetic field between coils 601, 602 parallel to their center axis and preferably mitigate the shunting effect of the shield 1601. For example, coils 601, 602 preferably direct the magnetic field through credential 108.

It is to be understood that housings for credentials mentioned above may refer to, for example, structure 1603 housing only credential 108, shield 1601 housing credential 108 and coils 601, 602 with or without spacers 1602a, 1602b, or other structure with or without shielding properties.

Figure 15:
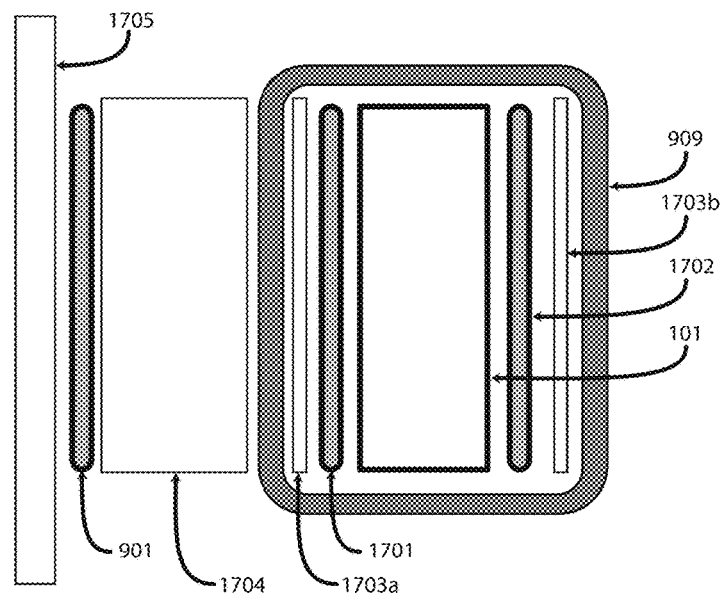
FIG. 15 is an illustration of a shield for a tenant credential reader assembly.

In FIG. 15, an embodiment of a shield 909 housing reader 101, reader pickup coils 1701, 1702, and spacers 1703a, 1703b are illustrated. FIG. 15 also shows a third spacer 1704 positioned between shield 909 and public reader pickup 901, which preferably establishes the distance between public reader pickup 901 and shield 909. Spacer 1704 preferably mitigates field shunting when a user credential is presented to public reader pickup 901. A window 1705 in the embodiment shown is positioned on the opposite side of public reader pickup 901 from spacer 1704. Window 1705 preferably protects public reader pickup 901 from damage, for example, when a user presents a user credential to public reader pickup 901. Reader 101 is preferably supported and held in position between reader pickup coils 1701, 1702. Preferably, spacer 1703a maintains a fixed distance between coil 1701 and shield 909, and spacer 1703b maintains a fixed distance between coil 1702 and shield 909. Spacers 1703a, 1703b, 1704, and window 1705 are preferably formed from electromagnetically transparent material, and do not create interference.

Shield 909 may be formed from sheet metal or other material having magnetic shielding properties at the operating frequency of reader 101. Shield 909 may have a shunting effect on the magnetic lines of force generated by reader pickup coils 1701, 1702, which may reduce the signal strength when reader 101 interrogates a credential. Therefore, reader pickup coils 1701, 1702 are preferably wired as Helmholtz coils as shown in FIG. 6, which may align the magnetic field between reader pickup coils 1701, 1702 parallel to their center axis and preferably mitigate the shunting effect of the shield 909. For example, reader pickup coils 1701, 1702 preferably direct the magnetic field through reader 101.

Figure 16:
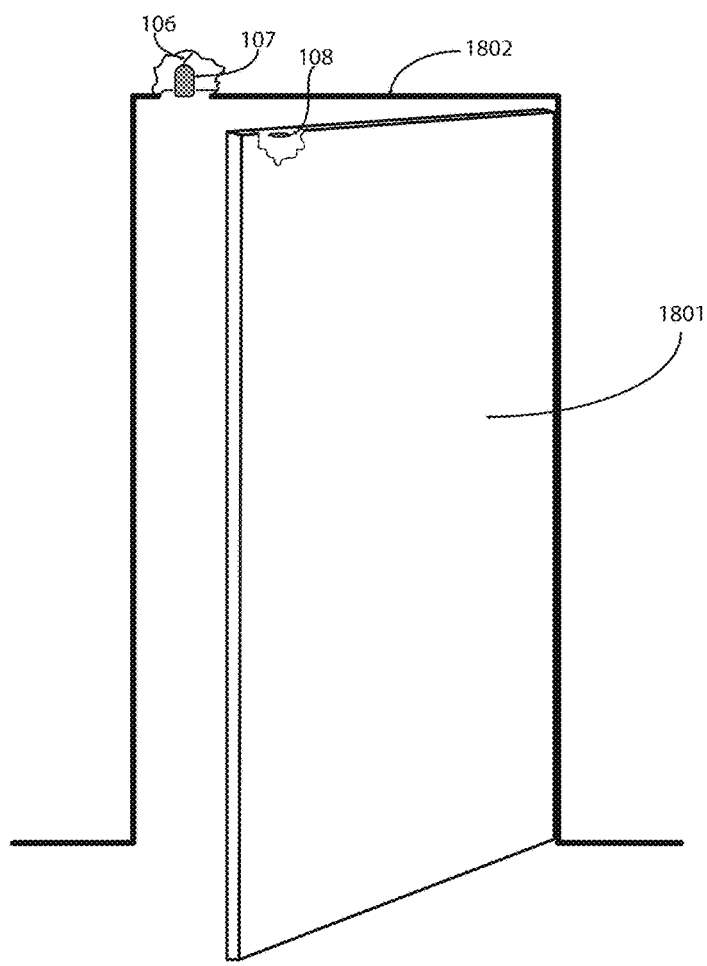
FIG. 16 is an illustration of a system for monitoring a door position.

FIG. 16 illustrates an embodiment of a system for monitoring the position of an object, by way of non-limiting example, a door, window, drawer, shutter, or a valuable item. The embodiment shown is applied to a door 1801, shown open, which fits into frame 1802 when closed. Credential 108 is positioned on door 1801 and thus moves toward or away from frame 1802 according to the movement of door 1801. Preferably, credential 108 is within range of credential read head 107 located within or proximate frame 1802 when door 1801 is closed, and out of range when door 1801 is open. As shown, credential read head 107 is connected to a monitoring circuitry by credential transmission line 106. Referring to the embodiment illustrated in FIG. 1, when door 1801 is closed, credential 108 is interrogated by the reader when the associated credential selector switch is activated. Preferably, a single reader may monitor a number of doors or other objects.

Certain potential benefits of embodiments of the invention include reduced cost and maintenance compared to some high-security monitoring systems and methods by working with encrypted credentials which tend to cost less. Another potential benefit is that embodiments of the invention work with any RFID credential including those that use cryptographic protections.

One or more of the switches may be manual switches, electromechanical relays, solid state switches, or combinations thereof. A switch may alternatively be a single pole switching element, or position on a selector switch with more than two positions, for example, a manual or motorized controlled six position Elma A4 series switch. Additionally, a switch may be a switched tuning element. For example, ¼ wave transmission lines with shunting switches as illustrated in Skyworks Application Note "Design with PIN Diodes." Furthermore, it may be preferred to limit the activation time of a switch to a predetermined value.

In accordance with an embodiment of the invention, the reader pickup coil is located behind its respective reader and does not impede the ordinary use of the reader. The reader pickup coil may be directly connected to the credential read head to monitor a single door or object.

In accordance with an embodiment of the invention, shielding may be used to shape the virtual credential read distance to achieve the desired position sensitivity. Preferably, the credential is a virtually real credential.

As those skilled in the art would understand, circuits, cables, and/or transmission lines may be bidirectional. Furthermore, a transmission line, if not employed for transmission of RFID signals, may be employed for differential transmission of data signals. Furthermore, a circuit may be tuned or a transmission line may be neutralized with series and/or parallel capacitors, resistors, inductors, or combinations thereof. For example, tuning of the circuit and neutralizing credential transmission lines 106a, 106b, through 106n and/or credential read heads 107a, 107b, through 107n with either series and/or parallel capacitors, resistors, inductors or combinations of elements may improve performance.

It is to be understood that the term "tenant" is not limited to tenants of a building, but rather, refers in general to any user that may wish to limit access to certain areas, equipment, etc. For example, the user may be an organization that utilizes or controls a certain area, equipment, etc.

Other alterations may be made without deviating from the scope of the invention. Accordingly, the system and method, the use, steps, order of steps, etc. may be varied as a matter of application specific design choice without deviating from the scope of the invention. For example, magnetic coils, B field antennas, and RFID systems that employ E field antenna systems may be provided in accordance with certain embodiments of the invention.

It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between.

I claim:

1. A credential scanning system comprising:
    a first reader within wireless transmission range of a first reader pickup coil;
    a first credential read head comprising a first credential pickup coil within wireless transmission range of a first credential;
    a first credential switch;
    a first transmission line connecting said first reader pickup coil to said first credential switch;
    a second transmission line connecting said first credential switch to said first credential pickup coil;
    wherein when said first credential switch is activated, an indicium from said first credential is transmitted from said first credential pickup coil to said first reader.

2. The system of claim 1, wherein said first reader pickup coil is permanently physically positioned proximate said first reader within wireless transmission range thereof.

3. The system of claim 1, wherein said first credential pickup coil is permanently physically positioned proximate said first credential within wireless transmission range thereof.

4. The system of claim 1, wherein said first credential is a virtually real credential.

5. The system of claim 1, wherein said first credential read head further comprises a second credential pickup coil.

6. The system of claim 1, wherein said first credential read head comprises at least two credential pickup coils arranged as Helmholtz coils.

7. The system of claim 1, further comprising
    a second credential read head comprising a second credential pickup coil within wireless transmission range of a second credential;
    a second credential switch;
    a third transmission line connecting said second credential switch to said second credential pickup coil;
    wherein said first reader pickup coil and said second credential pickup coil transmit a second signal therebetween when said second credential switch is activated.

8. The system of claim 7, wherein said second credential switch is connected to said first transmission line, wherein said first credential switch and said second credential switch are arranged in parallel along said first transmission line.

9. The system of claim 7, further comprising a fourth transmission line connecting said first credential switch and said second credential switch, wherein said first credential switch and said second credential switch are arranged in series.

10. The system of claim 7, wherein if said first credential switch is activated, said second credential switch is deactivated, and wherein if said second credential switch is activated, said first credential switch is deactivated.

11. The system of claim 7, wherein said first credential pickup coil operates on a first frequency and said second credential pickup coil operates on a second frequency different from said first frequency.

12. The system of claim 7, further comprising a second reader pickup coil connected to said second credential switch.

13. The system of claim 12, wherein said first reader pickup coil operates on a first frequency and said second reader pickup coil operates on a second frequency different from said first frequency.

14. The system of claim 1, further comprising an access control system.

15. The system of claim 14, further comprising a switch coil connected to said first credential switch, wherein energizing said switch coil activates said first credential switch, wherein said access control system determines whether to energize said switch coil.

16. The system of claim 14, further comprising a tenant credential reader connected to said access control system.

17. The system of claim 14, further comprising a coordinating system which controls said first credential switch, said coordinating system connected to said tenant access control system.

18. The system of claim 14, further comprising a public reader connected via a tenant credential reader switch to a tenant credential reader pickup coil when said tenant credential reader switch is in a closed position, said tenant credential reader pickup coil being within wireless transmission range of said tenant credential reader.

19. The system of claim 18, further comprising a reader switch which connects said first reader pickup coil to said public reader when said reader switch is in a first position, and connects said first reader pickup coil to said first credential switch when said reader switch is in a second position.

20. The system of claim 19, further comprising a coordinating system which controls said reader switch, said coordinating system connected to said tenant access control system.

21. The system of claim 1, further comprising a user interface and an interface reader proximate said user interface, said user interface and said interface reader being in communication with said access control system, said interface providing a user with a selection of authorizations available to said user.

22. The system of claim 18, further comprising a user interface and an interface reader proximate said user interface, said user interface and said interface reader being in communication with said access control system, said interface providing a user with a selection of authorizations available to said user.

23. The system of claim 1, further comprising a movable structure attached to said first credential and a second credential, wherein moving said movable structure displaces said first credential out of wireless transmission range of said first credential pickup coil and places said second credential within wireless transmission range of said first credential pickup coil.

24. The system of claim 1, wherein said first credential switch has a predetermined activation time.

25. The system of claim 1, wherein said first credential switch is under manual control.

26. The system of claim 1, wherein said first credential switch is under electrical control.

27. The system of claim 1, wherein said system controls an elevator dispatch system.

28. The system of claim 1, further comprising a credential monitoring mechanism comprising a first tamper reader connected to said first credential switch, said first tamper reader being connected to said first credential pickup coil when said first credential switch is deactivated.

29. The system of claim 1, further comprising a credential shield shielding said first credential and said first credential pickup coil.

30. The system of claim 1, further comprising a reader shield shielding said first reader and said first reader pickup coil.

31. A method for reading a credential to determine whether or not to grant access requested by a user, said method comprising:
    providing a first reader being in wireless communication with a first reader pickup coil;
    providing a first credential switch connected to said first reader pickup coil by a first transmission line;

providing a first credential read head connected to said first credential switch by a second transmission line, said first credential read head being in wireless communication with a first credential;

interrogating a user credential with said first reader and obtaining a user indicium from said user credential;

transmitting said user indicium to said first credential switch;

activating said first credential switch and connecting said first transmission line and second transmission line;

transmitting a credential indicium from said first credential to said first reader.

32. The method of claim 31, wherein reading said user credential with said first reader comprises determining via an access control system whether said user credential is a tenant credential prior to activating said first credential switch.

33. The method of claim 31, wherein said first reader is multi-frequency capable, and said first credential has a first operating frequency; the method further comprising:

providing a second credential read head in wireless communication with a second credential, said second credential having a second operating frequency different from said first operating frequency;

providing a second reader pickup coil and a second credential switch;

reading a user credential having a user credential frequency via said first reader;

activating said first credential switch and interrogating said first credential if said user credential frequency is the same as said first operating frequency; and activating said second credential switch and interrogating said second credential if said user credential frequency is the same as said second operating frequency.

34. The method of claim 31, further comprising selectively displacing said first credential away from said first credential read head and positioning a second credential within wireless transmission range of said first credential read head.

35. The method of claim 34, further comprising providing a motorized device for displacing said first credential and said second credential.

36. The method of claim 31, further comprising:

reading a user credential presented by a user at a kiosk;

transmitting said user indicium from said user credential to a coordinating system; and determining which access to grant said user.

37. The method of claim 36, further comprising:

reading said user credential at a public reader pickup coil;

interrogating a tenant credential reader connecting to said coordinating system;

interpreting said user credential;

activating a tenant credential reader switch and disconnecting said tenant credential reader from said public reader pickup coil;

verifying said user credential; and deciding whether to activate first credential switch to connect said first credential read head to said first reader pickup coil.

38. The method of claim 37, further comprising providing a plurality of credentials, a plurality of credential read heads, and a plurality of credential switches.

39. The method of claim 37, further comprising activating a reader switch and connecting said public reader pickup to said first reader pickup coil.

40. The method of claim 39, wherein activating said reader switch disconnects said first reader pickup coil from said first credential switch.

41. The method of claim 36, further comprising displaying at said kiosk a set of floors accessible to said user.

42. The method of claim 31, further comprising interrogating said first credential with a tamper reader, and providing an alert if said first credential is moved out of range of said first credential read head.

43. A credential scanning system comprising:

a reader within wireless transmission range of a first reader pickup coil;

a public reader pickup coil connected to a tenant credential reader pickup coil selectively via a tenant credential reader pickup switch;

said public reader pickup coil connected to said first reader pickup coil selectively via a reader pickup switch;

a credential synthesizer connected to said first reader pickup coil selectively via said reader pickup switch; and a coordinating system instructing said credential synthesizer to synthesize a synthesized credential in response to a user credential indium received from said public reader pickup coil;

wherein said reader receives said synthesized credential from said credential synthesizer.

44. A method for reading a credential to determine whether or not to grant access requested by a user, said method comprising:

reading a user credential presented by a user to a public reader;

determining what access should be granted to said user;

synthesizing a synthesized credential programmed to grant a first access;

transmitting said synthesized credential to a system reader;

determining whether said user is authorized by interrogating a system with said synthesized credential, and if said user is authorized, granting said user said first access.

45. The method of claim 44, wherein said first access is access to a floor of a building.

* * * * *